(12) United States Patent
Kono et al.

(10) Patent No.: US 11,040,479 B2
(45) Date of Patent: Jun. 22, 2021

(54) STRUCTURE AND METHOD FOR MANUFACTURING STRUCTURE

(71) Applicant: Nissan Motor Co., Ltd., Yokohama (JP)

(72) Inventors: Kentaro Kono, Kanagawa (JP); Shinichiro Takemoto, Kanagawa (JP); Hiroshi Uchida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 431 days.

(21) Appl. No.: 16/081,452

(22) PCT Filed: Sep. 29, 2016

(86) PCT No.: PCT/JP2016/078931
§ 371 (c)(1),
(2) Date: Aug. 31, 2018

(87) PCT Pub. No.: WO2017/149818
PCT Pub. Date: Sep. 8, 2017

(65) Prior Publication Data
US 2019/0099937 A1    Apr. 4, 2019

(30) Foreign Application Priority Data

Mar. 4, 2016    (JP) .............................. JP2016-042733

(51) Int. Cl.
*B29C 53/00*    (2006.01)
*B32B 13/00*    (2006.01)
(Continued)

(52) U.S. Cl.
CPC ............ *B29C 53/602* (2013.01); *B29B 13/08* (2013.01); *C08J 5/06* (2013.01); *D06M 10/025* (2013.01);
(Continued)

(58) Field of Classification Search
CPC ....... B29C 53/00; B29C 53/60; B29C 53/602; B29B 13/00; B29B 13/08; C08J 5/00;
(Continued)

(56) References Cited

U.S. PATENT DOCUMENTS 6,514,449 B1 *    2/2003    Paulauskas ............. B29C 70/16
                                                                          264/167
8,227,051 B1 *    7/2012    Paulauskas .......... H05H 1/2406
                                                                          427/569

FOREIGN PATENT DOCUMENTS

CN    103206612 A    7/2013
EP    2418412 A1    2/2012
(Continued)

*Primary Examiner* — Jacob T Minskey
*Assistant Examiner* — Matthew Hoover
(74) *Attorney, Agent, or Firm* — Global IP Counselors, LLP

(57) ABSTRACT

A structure includes a reinforcing member made up of reinforcing fibers that are impregnated with a resin. The reinforcing member includes a first region and a second region. The first region is formed by irradiating the reinforcing fibers with plasma. The second region is formed by irradiating the reinforcing fibers with a smaller amount of the plasma than the first region. The reinforcing member is provided such that the first region is positioned in a location where more strength is required than the second region.

20 Claims, 11 Drawing Sheets

(51) Int. Cl.
*C08J 5/00* (2006.01)
*D06M 10/00* (2006.01)
*F17C 1/00* (2006.01)
*B29C 53/60* (2006.01)
*C08J 5/06* (2006.01)
*F17C 1/06* (2006.01)
*D06M 10/02* (2006.01)
*B29B 13/08* (2006.01)
*B29L 31/00* (2006.01)

(52) U.S. Cl.
CPC .......... *F17C 1/06* (2013.01); *B29L 2031/7156* (2013.01); *D06M 10/00* (2013.01)

(58) Field of Classification Search
CPC .......... C08J 5/06; D06M 10/00; D06M 10/02; D06M 10/025; F17C 1/00; F17C 1/06
See application file for complete search history.

(56) References Cited

FOREIGN PATENT DOCUMENTS

| | | | |
|---|---|---|---|
| JP | 61-258065 | A | 11/1986 |
| JP | 63-144153 | A | 6/1988 |
| JP | 4-249545 | A | 9/1992 |
| JP | 9-280496 | A | 10/1997 |
| JP | 2005-337394 | A | 12/2005 |
| JP | 2006-233354 | A | 9/2006 |
| JP | 2012-525476 | A | 10/2012 |
| JP | 2016-56240 | A | 4/2016 |

\* cited by examiner

STRUCTURE AND METHOD FOR MANUFACTURING STRUCTURE

CROSS-REFERENCE TO RELATED APPLICATIONS

This application is a U.S. national stage application of International Application No. PCT/JP2016/078931, filed on Sep. 29, 2016, which claims priority to Japanese Patent Application No. 2016-042733, filed on Mar. 4, 2016. The entire contents disclosed in Japanese Patent Application No. 2016-042733 is hereby incorporated herein by reference.

BACKGROUND

Field of the Invention

The present invention relates to a structure and a method for producing a structure.

Background Information

In recent years, reinforcing members, which are obtained by impregnating reinforcing fibers with resin, for use in automobile parts have attracted attention. More specifically, reinforcing members can be wound around the outer circumference of high-pressure gas storage containers in which hydrogen gas, etc., used as a fuel for automobiles, is stored. Reinforcing members are also used in automobile panels in order to reduce automobile weight.

In general, since reinforcing fibers exhibit low adherence to resin, it is necessary to improve the adherence of the reinforcing fibers to resin.

In relation to the foregoing, for example, Japanese Laid Open Patent Application No. 61-258065 (Patent Document 1) discloses an adhesiveness improvement method for modifying the surface of an aromatic polyamide fiber and improving the adhesiveness by irradiating plasma on the aromatic polyamide fiber from a direction that is orthogonal to the arrangement surface of the fibers.

SUMMARY

The stresses to which the above-described high-pressure gas storage containers and automobile panels are subjected differ and are location-dependent. However, product design is based on damage not occurring at locations that receive maximum stress, so that in terms of the overall product, there are locations at which the product thickness is excessive relative to the stress, which increases the weight of the product as a whole.

In order to solve the problem described above, the object of the present invention is to provide a structure and a method for producing a structure that can achieve a reduction in weight for the product as a whole by reducing the wall thickness while maintaining suitable strength.

A structure according to the present invention which realizes the above-described object comprises a reinforcing member made up of reinforcing fibers that have been impregnated with a resin. The reinforcing member includes a first region formed by irradiating the reinforcing fibers with a plasma, and a second region formed by irradiating the reinforcing fibers with a smaller amount of the plasma or formed without plasma irradiation. The structure is formed by providing with the structure with a reinforcing member such that the first region is positioned in a location that requires more strength than the second region.

In addition, a method for producing the structure according to the present invention which realizes the above-described is a method for producing a structure comprising a reinforcing member made of reinforcing fibers impregnated with a resin. In the method for producing the structure, the reinforcing fibers are irradiated with a plasma and impregnated with the resin to form a first region in the reinforcing member. Then, the reinforcing fibers are irradiated with a smaller amount of the plasma than the first region, or plasma is not irradiated thereon, and impregnated with a resin to form a second region in the reinforcing member. Thereafter, the first region is positioned in a location that requires greater strength than the second region.

DETAILED DESCRIPTION OF THE EMBODIMENTS

Embodiments of the present invention will be explained below with reference to the appended drawings. In the explanations of the drawings, the same elements have been assigned the same reference symbols and redundant explanations have been omitted. Dimensional ratios of the drawings are exaggerated for the sake of convenience of explanation and may differ from actual ratios. In the present embodiment, a high-pressure gas storage container 1 formed by winding reinforcing members 20 around the outer perimeter surface 10A of a liner 10 (corresponding to a core member) will be described as one example of a structure.

Figure 1:
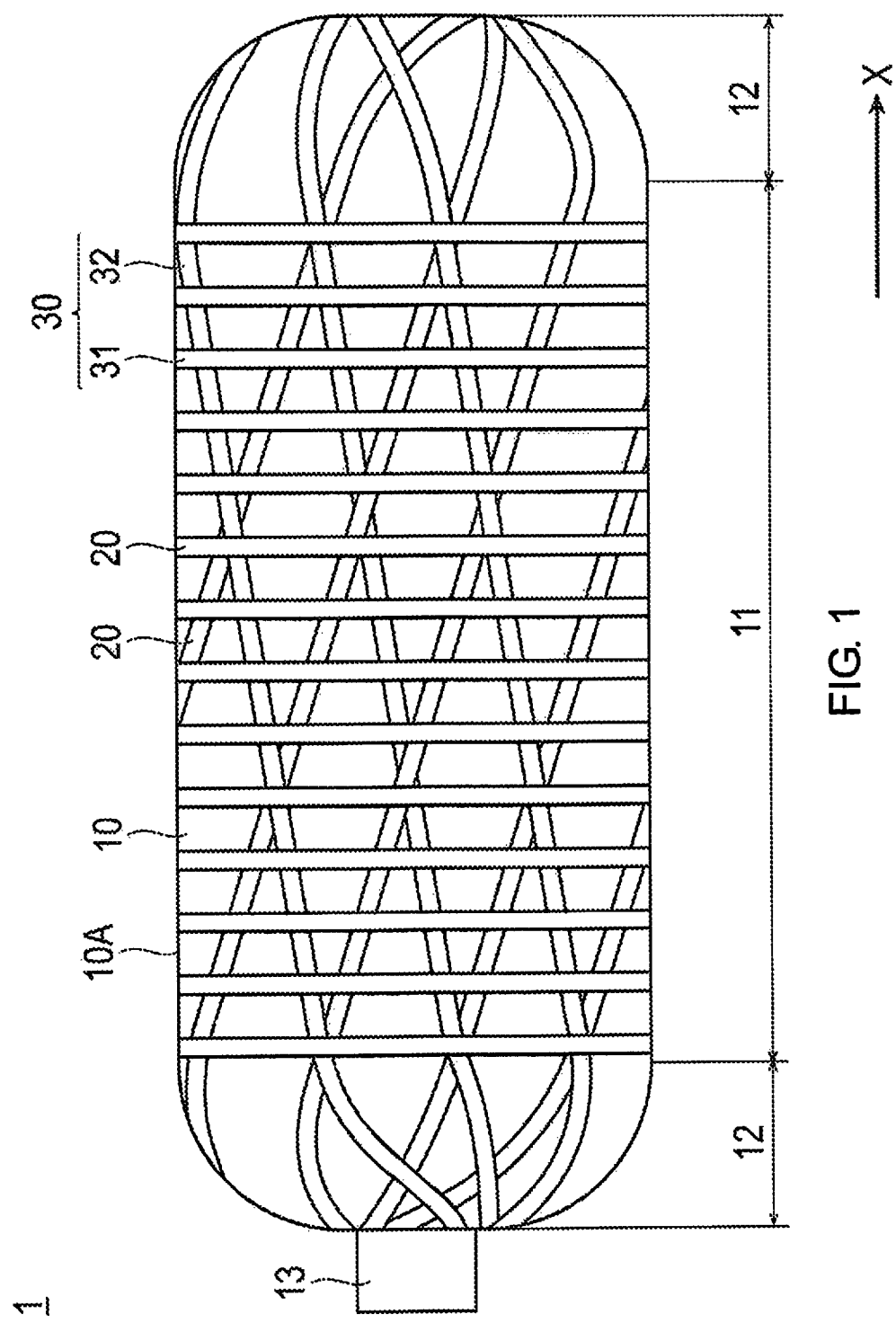
FIG. 1 is a view illustrating a high-pressure gas storage container according to the present embodiment.
Figure 2:
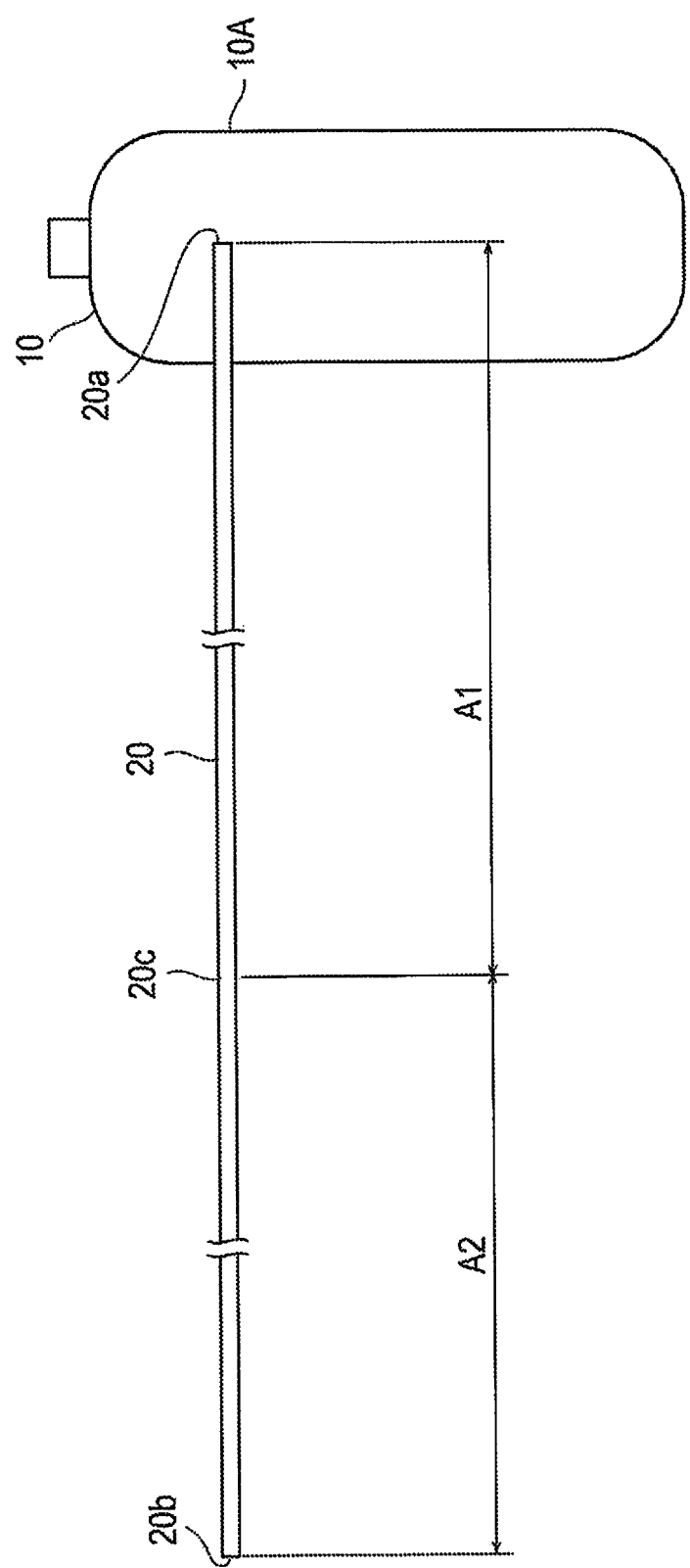
FIG. 2 is a view illustrating the state before a reinforcing member is wound around the outer perimeter surface of a liner.
Figure 3:
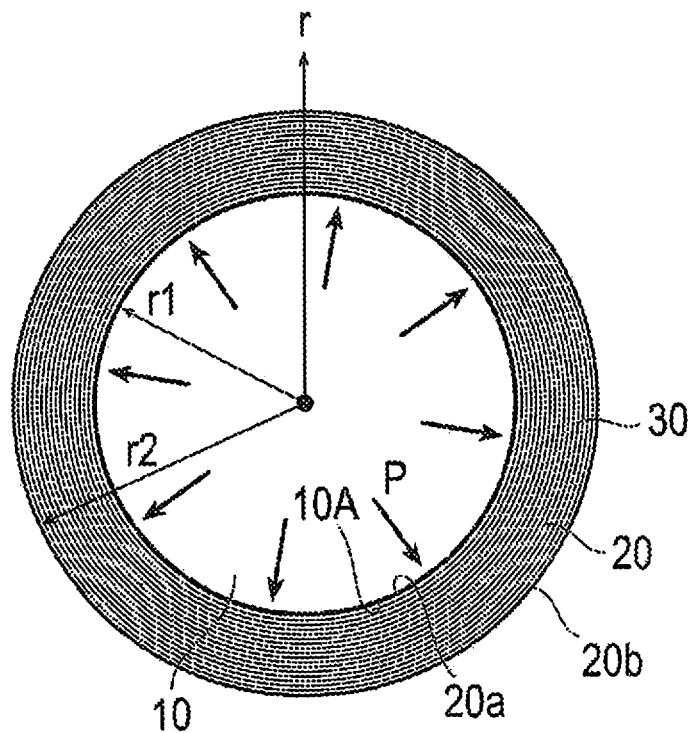
FIG. 3 is a view illustrating the state after a reinforcing member is wound around the outer perimeter surface of the liner.
Figure 4:
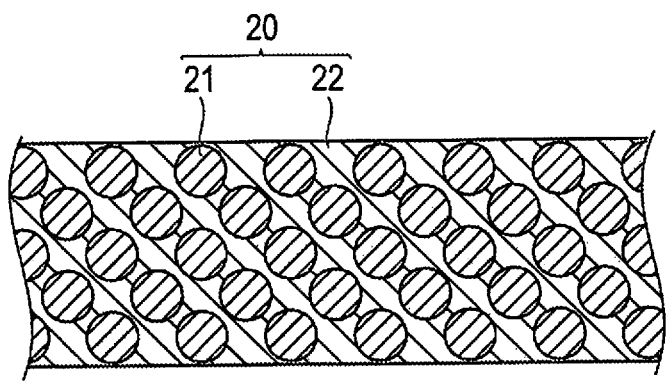
FIG. 4 is a cross-sectional view illustrating a portion of a reinforcing member made of reinforcing fibers impregnated with a resin.
Figure 5:
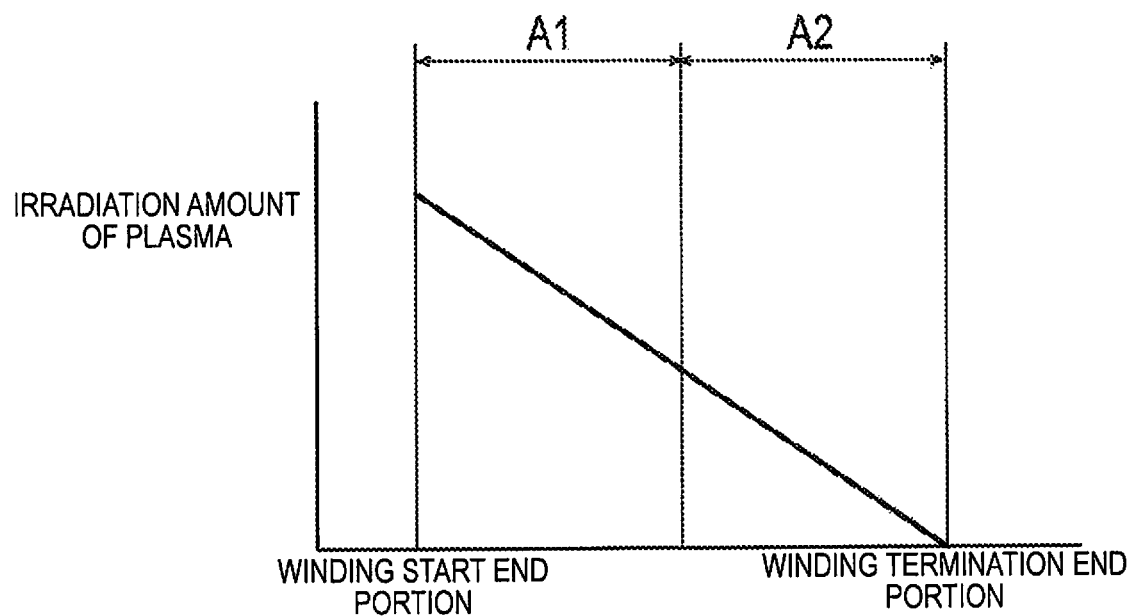
FIG. 5 is a graph illustrating the distribution of the plasma irradiation amount.
Figure 6:
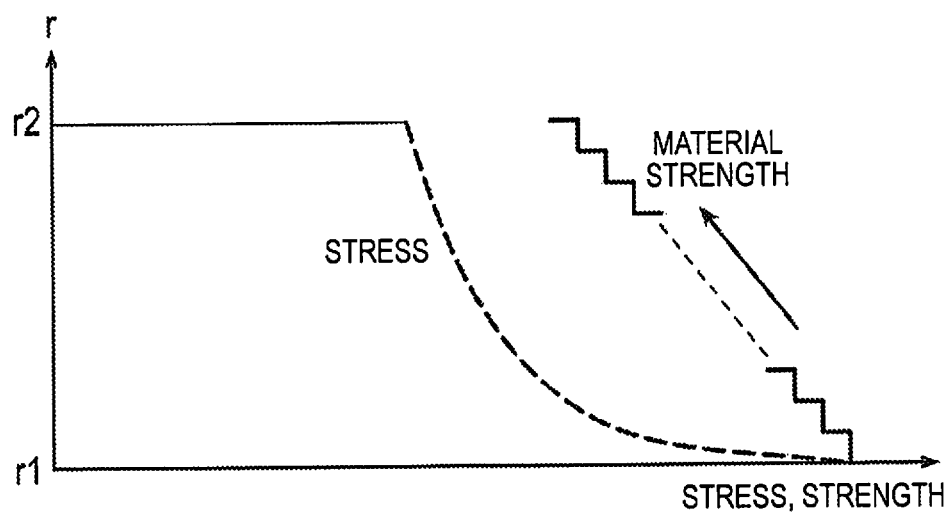
FIG. 6 is a graph illustrating the relationship between the stress that is generated in a reinforcing layer and the material strength of the reinforcing layer.

FIG. 1 is a view illustrating the high-pressure gas storage container 1 according to the present embodiment. FIG. 2 is a view illustrating the state before the reinforcing members 20 are wound around the outer perimeter surface 10A of a liner 10. FIG. 3 is a view illustrating the state after the reinforcing members 20 are wound around the outer perimeter surface 10A of the liner 10. FIG. 4 is a cross-sectional view illustrating part of the reinforcing member 20 made up of a plurality of reinforcing fibers 21 impregnated with a resin 22. FIG. 5 is a graph illustrating the distribution of the irradiation amount of a plasma P. FIG. 6 is a graph illustrating the relationship between the stress that is generated in a reinforcing layer 30 and the material strength of the reinforcing layer 30. For ease of comprehension, FIG. 1 shows a process in which the reinforcing members 20 are wound around the outer perimeter surface 10A of the liner 10. In addition, the irradiation of the plasma P and the state of impregnating with the resin 22 are omitted in FIG. 2.

High-Pressure Gas Storage Container

In general, the high-pressure gas storage container 1 according to the present embodiment comprises a liner 10 for holding a high-pressure gas, such as hydrogen gas, and a reinforcing layer 30 that is formed by winding strip-shaped reinforcing members 20 around the outer perimeter surface 10A of the liner 10, as is illustrated in FIGS. 1-3.

In addition, the high-pressure gas storage container 1 is provided with the reinforcing members 20 that are made up of reinforcing fibers 21 that are impregnated with resin 22, as is illustrated in FIG. 4. The reinforcing members 20 include a first region A1 formed by irradiating the reinforcing fibers 21 with a plasma P and a second region A2 formed by irradiating the reinforcing fibers 21 with a smaller amount of the plasma P than the first region A1, as is illustrated in FIGS. 2 and 5. The first region A1 is positioned on the inner perimeter side of the reinforcing layer 30, which requires greater strength than the second region A2. The configuration of the high-pressure gas storage container 1 according to the present embodiment will be described in detail below.

The liner 10 is formed as a tank having the form of a cylinder. The liner 10 has gas barrier properties and suppresses the permeation of high-pressure gas to the outside. The liner 10 comprises a body portion 11 that is centered about the X axis direction, mirror-image portions 12 that are provided at each end of the body portion 11 in the X axis direction, and a mouthpiece 13 that is provided in one of the mirror-image portions 12, as is illustrated in FIG. 1.

The body portion 11 is configured with a tubular shape, so as to extend in the X axis direction.

The mirror-image portions 12 are curved, so as to taper toward the outside in the X axis direction.

The mouthpiece 13 is configured to project from the mirror-image portion 12 outwardly in the X axis direction. A pipe is connected, or a valve mechanism comprising an on-off valve or a pressure reducing valve is connected, to the mouthpiece 13 in order to charge and discharge high-pressure gas into and from the high-pressure gas storage container 1. The mouthpiece 13 may be provided on the mirror-image portions 12 at each end.

A metal or synthetic resin material may be used to constitute the liner 10. Examples of metals that can be used include iron, aluminum, and stainless steel. Examples of synthetic resins that can be used include polyethylene, polyamide, and polypropylene.

The reinforcing layers 30 are formed by winding a predetermined number of the reinforcing members 20 around the outer perimeter surface 10A of the liner 10 from a winding start end portion 20a to a winding termination end portion 20b thereof, as is illustrated in FIGS. 2 and 3. In the present Specification, the winding start end portion 20a means the end portion of a reinforcing member 20 when winding around the outer perimeter surface 10A of the liner 10 is started, and a winding termination end portion 20b means the end portion of the reinforcing member 20 when winding around the outer perimeter surface 10A of the liner 10 is terminated.

The number of times the reinforcing members 20 are wound, that is, the number of reinforcing layers 30, is not particularly limited, but can be, for example, 20 to 30. By winding the reinforcing members 20 around the outer perimeter surface 10A of the liner 10, the reinforcing layers 30 improve the pressure resistance strength of the liner 10.

The reinforcing layer 30 includes a hoop layer 31 that is formed by winding the reinforcing member 20 around the body portion 11 in the circumferential direction and a helical layer 32 formed by winding the reinforcing member 20 around the body portion 11 and the mirror-image portions 12 in a spiral shape, as is illustrated in FIG. 1. The hoop layer 31 and the helical layer 32 are stacked in alternating fashion. It is not necessary for the hoop layer 31 and the helical layer 32 to be alternately stacked. That is, for example, the reinforcing members 20 can be wound to form two hoop layers 31 followed by two helical layers 32.

Because the hoop layer 31 is formed by winding the reinforcing member 20 around the body portion 11, the hoop layer contributes to the tensile strength in the radial direction of the body portion 11. Because the helical layer 32 is formed by winding the reinforcing member 20 around the body portion 11 and the mirror-image portions 12, the strength in the X axis direction of the high-pressure gas storage container 1 is thereby ensured.

The reinforcing members 20 that constitute the reinforcing layer 30 are made up of reinforcing fibers 21 that are impregnated with resin 22, as is illustrated in FIG. 4.

The reinforcing fibers 21 according to the present embodiment are formed by irradiating a plasma P thereon. In this manner, by irradiating the plasma P on the reinforcing fibers 21, it is possible to add an acidic functional group to the reinforcing fibers 21. As a result, the adhesiveness of the resin 22 to the reinforcing fibers 21 is improved, and the strength imparted by the reinforcing members 20 is improved.

In the reinforcing fibers 21, a relatively large amount of plasma P is irradiated in a first region A1 on the inner perimeter side of the reinforcing member 20 that constitutes the reinforcing layer 30, and a relatively small amount of plasma P is irradiated in a second region A2 on the outer perimeter side of the reinforcing member 20 that constitutes the reinforcing member 30, as is illustrated in FIGS. 2 and 5. More specifically, the reinforcing fibers 21 are formed such that the irradiation amount of the plasma P is continuously gradually reduced from the winding start end portion 20a to the winding termination end portion 20b of the reinforcing member 20, as is illustrated in FIG. 5.

In the reinforcing member 20 made up of reinforcing fibers 21 onto which plasma P has been irradiated in this manner, the strength continuously gradually decreases from the winding start end portion 20a to the winding termination end portion 20b, in the same manner as the distribution of the irradiation amount of the plasma P.

Then, the reinforcing member 20 is wound around the outer perimeter surface 10A of the liner 10 to create a reinforcing layer 30. At this time, the strength distribution of the reinforcing layer 30 in the radial direction r (refer to FIG. 3) becomes such that the strength decreases from the inner perimeter side to the outer perimeter side in the radial direction r, as is indicated by the solid line in FIG. 6 (refer to the arrow in FIG. 6).

On the other hand, internal pressure acts on the high-pressure gas storage container 1 from the high-pressure gas that is stored inside the liner 10, which causes stress a to be generated in the reinforcing layer 30.

The stress a that is generated in the reinforcing layer 30 is represented by the following formula (1) at a position R in the radial direction r, where the internal pressure of the high-pressure gas is P, the radius of the reinforcing layer 30 at the outermost perimeter is r2, and the radius of the reinforcing layer 30 at the innermost perimeter is r1, as is illustrated in FIG. 3.

Formula 1

$$\sigma = \frac{P \times r_1^2}{r_2^2 - r_1^2}\left(1 + \frac{r_2^2}{R^2}\right) \quad (1)$$

In this manner, the stress a that is generated in the reinforcing layer 30 continuously gradually decreases from the inner perimeter side to the outer perimeter side, as is indicated by the dotted line in FIG. 6.

In the present embodiment, the reinforcing member 20 has a strength that can withstand the stress a that is generated in the reinforcing layer 30, as is illustrated in FIG. 6.

Examples of reinforcing fibers 21 that can be used to constitute the reinforcing member 20 include carbon fibers, glass fibers, and polyamide fibers. In the present embodiment, carbon fibers, which will be described as an example, have a low coefficient of thermal expansion, excellent dimensional stability, and little reduction in mechanical properties even at high temperatures. Reinforcing fibers 21 are formed in the state of a bundle of about 1,000 to 50,000 carbon fibers.

Examples of resins 22 that can be used to constitute the reinforcing member 20 include thermosetting resins and thermoplastic resins. Examples of thermosetting resins that can be used include epoxy resin, polyester resin, and phenol resin. Examples of thermoplastic resins that can be used include polyamide resin and polypropylene resin.

Device for Producing the High-Pressure Gas Storage Container

Figure 7:
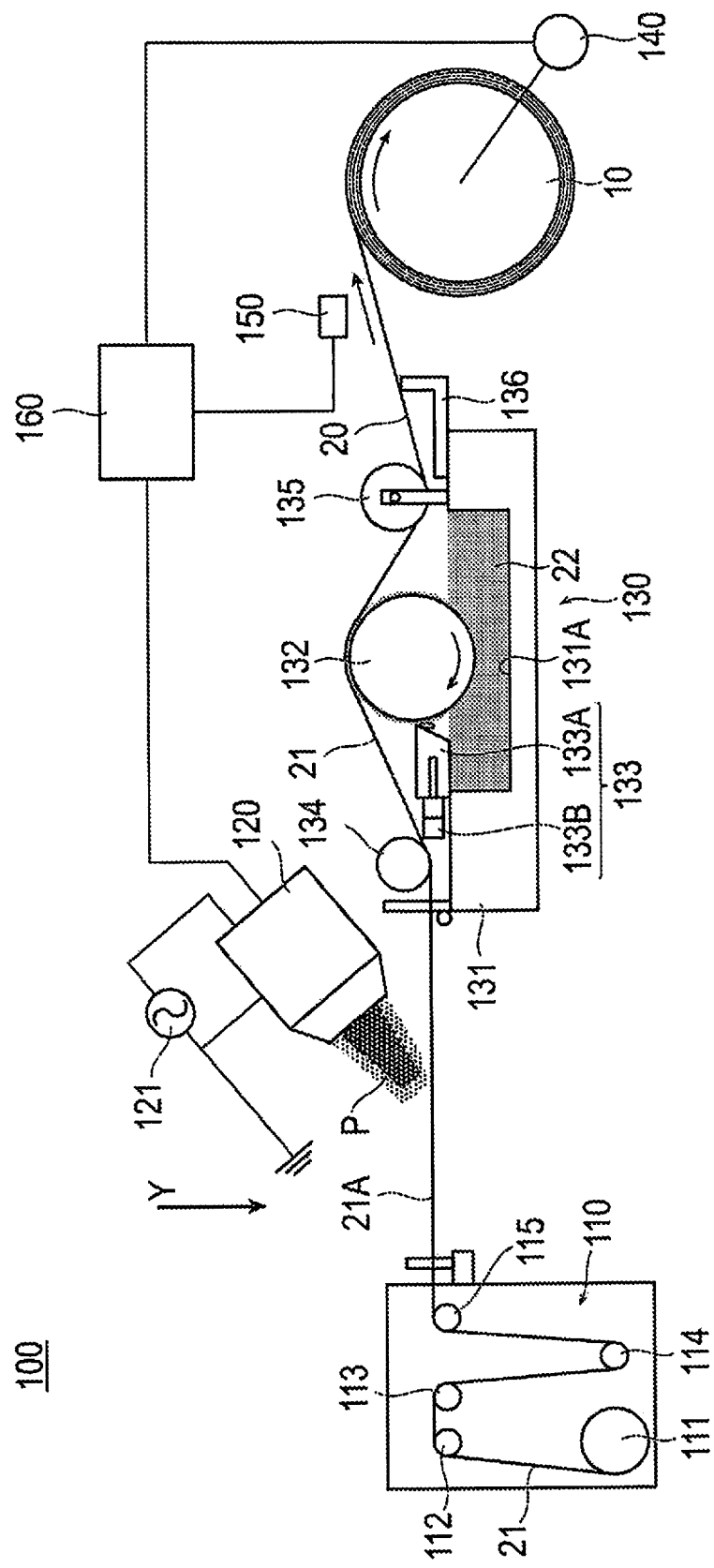
FIG. 7 is a view illustrating a device for producing the high-pressure gas storage container.

Next, a manufacturing device 100 of the high-pressure gas storage container 1 according to the present embodiment will be described with reference to FIG. 7. FIG. 7 is a view illustrating a manufacturing device 100 of a high-pressure gas storage container 1.

The manufacturing device 100 of the high-pressure gas storage container 1 comprises a housing unit 110, an irradiation unit 120, an impregnation unit 130, a transport unit 140, a detection unit 150, and a control unit 160, as is illustrated in FIG. 7.

The housing unit 110 houses bobbin-shaped reinforcing fibers 21. The housing portion 110 includes a setting part 111 on which the bobbin-shaped reinforcing fibers 21 are set and four rollers 112-115 that maintain the tensile force on the reinforcing fibers 21.

The irradiation unit 120 irradiates a plasma P onto the reinforcing fibers 21. As the present applicant has disclosed in Japanese Patent Application No. 2014-181512, the irradiation unit 120 preferably irradiates the plasma P from a direction that is tilted from the surface 21A of the reinforcing fibers 21 in the Y axis direction (direction orthogonal to the surface 21A). The irradiation unit 120 preferably irradiates the plasma P onto the surface 21A of the reinforcing fibers 21 from a direction that is tilted at least 30° with respect to the Y axis direction. By irradiating the plasma P from a direction that is tilted with respect to the Y axis direction in this manner, plasma gas is irradiated obliquely onto the surface 21A of the reinforcing fibers 21, so that compression of the plasma gas is suppressed, and it is possible to carry out irradiation while allowing the high-temperature portion at the center to be released. Therefore, it is possible to efficiently irradiate plasma P onto the reinforcing fibers 21 and to add an acidic functional group to the reinforcing fibers 21 while reducing damage to the reinforcing fibers 21.

It is preferable to use an AC power source 121 as the power source of the irradiation unit 120. The AC power source 121 is grounded (grounded).

The irradiation intensity of the plasma P that is irradiated from the irradiation unit 120 can be adjusted by adjusting the plasma voltage, current, frequency, electrodes, and gas conditions (composition of the gas). Hereinbelow, "adjusting the irradiation intensity of the plasma P" in the present Specification means adjusting the irradiation intensity of the plasma P by adjusting at least one of the above-described conditions of plasma voltage, current, frequency, electrodes, and gas.

One example of the irradiation condition of the plasma P will be described below.

From the standpoint of facility in generating the plasma P, the plasma voltage is, for example, 200-400 V, and is preferably 260-280 V.

From the standpoint of facility in generating the plasma P, the pulse repetition rate is, for example, 10-30 kHz, and is preferably 16-20 kHz.

The plasma irradiation distance is, for example, 2-30 mm, and is preferably 10-15 mm. If the plasma irradiation distance is short, the reinforcing fibers 21 may become damaged, and if the plasma irradiation distance is long, the surface modification effect is reduced.

The plasma irradiation time is, for example, 0.1-5.0 seconds, and is preferably 0.5-1.0 second. If the plasma irradiation time is short, the surface modification effect is reduced, and if the plasma irradiation time is long, the reinforcing fibers 21 may become damaged.

An example of a plasma gas that can be used is a mixed gas containing 0.5% or more of oxygen, nitrogen, or helium.

The impregnation unit 130 impregnates the reinforcing fibers 21 that are irradiated with plasma P with resin 22. The impregnation unit 130 includes a storage unit 131 in which the resin 22 is stored and a rotation unit 132 that rotates synchronously with the transport of the reinforcing fibers 21 while in contact with the reinforcing fibers 21, as is illustrated in FIG. 7. The impregnation unit 130 further includes an adjustment unit 133 that adjusts the amount of resin 22 that adheres to the rotation unit 132, and a pair of rollers 134, 135 that is provided on the upstream side and the downstream side of the rotation unit 132 in the transport direction and that maintain the tensile force. In addition, the impregnation unit 130 further includes a guide portion 136 that is provided on the downstream side of the downstream side roller 135 and guides the reinforcing fibers 21 toward the liner 10.

The storage unit 131 has a recessed portion 131A on the top, and the resin 22 is stored in the recessed portion 131A, as is illustrated in FIG. 7.

On the lower side, the rotation unit 132 is in contact with the resin 22 that is stored in the recessed portion 131A, and, on the upper side, the rotation unit rotates while in contact with the reinforcing fibers 21 being transported. The rotation unit 132 rotates clockwise synchronously with the transport of the reinforcing fibers 21. With the clockwise rotation of the rotation unit 132 in this manner, the resin 22 that adheres to the outer perimeter of the rotation unit 132 is raised and adheres to the reinforcing fibers 21 on which the plasma P has been irradiated. It is thereby possible to impregnate the reinforcing fibers 21 with the resin 22 to form the reinforcing members 20. The rotation unit 132 maintains the tensile force on the reinforcing fibers 21 on which the plasma P has been irradiated together with the rollers 134, 135.

The adjustment unit 133 adjusts the amount of the resin 22 that adheres to the outer perimeter of the rotation unit 132. The adjustment unit 133 includes a removal part 133A that removes only a predetermined amount of the resin 22 by coming in contact with the resin 22 that has adhered to the outer perimeter of the rotation unit 132 and a moving part 133B that moves the removal part 133A so as to be able to move toward and away from the rotation unit 132.

When the moving part 133B moves the removal part 133A to the right side in FIG. 7, a larger amount of the resin 22 that has adhered to the outer perimeter of the rotation unit 132 is removed. On the other hand, when the moving part 133B moves the removal part 133A to the left side in FIG. 7, a smaller amount of the resin 22 that has adhered to the outer perimeter of the rotation unit 132 is removed.

The guide portion 136 guides the reinforcing fibers 21 that are impregnated with the resin 22 toward the liner 10. The guide portion 136 is in the form of an L.

The configuration of the impregnation unit 130 is not particularly limited as long as the configuration is capable of impregnating the reinforcing fibers 21 that are irradiated with plasma P with resin 22.

The transport unit 140 winds the reinforcing members 20 that are formed by impregnating, with the resin 22, the reinforcing fibers 21 on the surface 21A of which the plasma P has been irradiated, around the outer perimeter surface 10A of the liner 10, while transporting the reinforcing fibers 21 from the left side to the right side in FIG. 7. The transport unit 140 is a motor.

The detection unit 150 detects the transport speed of the reinforcing fibers 21. A known speed sensor may be used as the detection unit 150. The location where the detection unit 150 is disposed is not particularly limited as long as the location is within a range in which the reinforcing fibers 21 are transported.

The control unit 160 carries out operation control of the irradiation unit 120, the transport unit 140, and the like. A control unit configured from a known microcomputer comprising a CPU, a RAM, a ROM, and the like can be used as the control unit 160.

Method for Producing the High-Pressure Gas Storage Container

Figure 8:
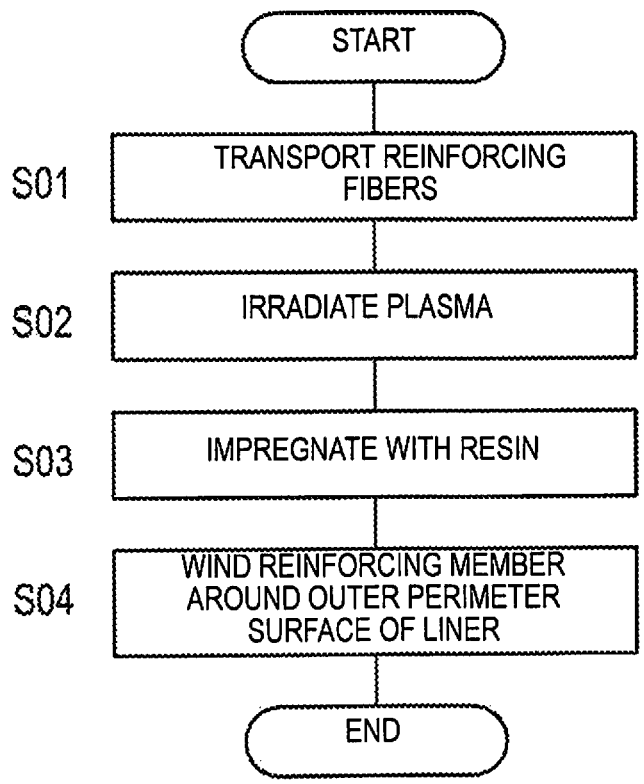
FIG. 8 is a flowchart illustrating a method for producing a high-pressure gas storage container.

Next, a method for producing the high-pressure gas storage container 1 according to the present embodiment will be described with reference to the flowchart of FIG. 8. The method for producing the high-pressure gas storage container 1 according to the present embodiment is carried out according to the filament winding method.

First, the transport unit 140 is operated in a state in which the bobbin-shaped reinforcing fibers 21 are set in the setting part 111 and the liner 10 is set in the position shown in FIG. 7. The liner 10 thereby rotates and the reinforcing fibers 21 are transported (S01). At this time, the detection unit 150 detects the transport speed of the reinforcing fibers 21.

Next, the irradiation unit 120 irradiates plasma P onto the reinforcing fibers 21 that are being transported (S02).

In the step for irradiating the plasma P, the plasma P is irradiated onto the reinforcing fibers 21 that constitute the reinforcing member 20 while the irradiation amount is continuously gradually reduced from the winding start end portion 20a to the winding termination end portion 20b of the reinforcing member 20 (refer to FIG. 5).

The irradiation amount of plasma P is adjusted by adjusting the irradiation intensity of the irradiation unit 120 and the transport speed of the reinforcing fibers 21.

That is, the irradiation amount of the plasma P onto the reinforcing fibers 21 is continuously reduced by carrying out at least one of an adjustment operation to reduce the irradiation intensity of the irradiation unit 120 and an operation to increase the transport speed of the reinforcing fibers 21 from the front end to the rear end in the transport direction.

Next, the reinforcing member 20 is formed by impregnating the reinforcing fibers 21 on which the plasma P has been irradiated (S03) with the resin 22.

The strength of the reinforcing member 20 continuously gradually decreases from the winding start end portion 20a to the winding termination end portion 20b, in the same manner as the distribution of the irradiation amount of the plasma P.

Next, the reinforcing member 20 is wound around the outer perimeter surface 10A of the liner 10 to create a reinforcing layer 30 (S04).

Because the strength of the reinforcing member 20 continuously gradually decreases from the winding start end portion 20a to the winding termination end portion 20b, a reinforcing layer 30 formed by the winding of the reinforcing member 20 has the strength distribution in the radial direction r indicated by the solid line in FIG. 6.

Figure 9:
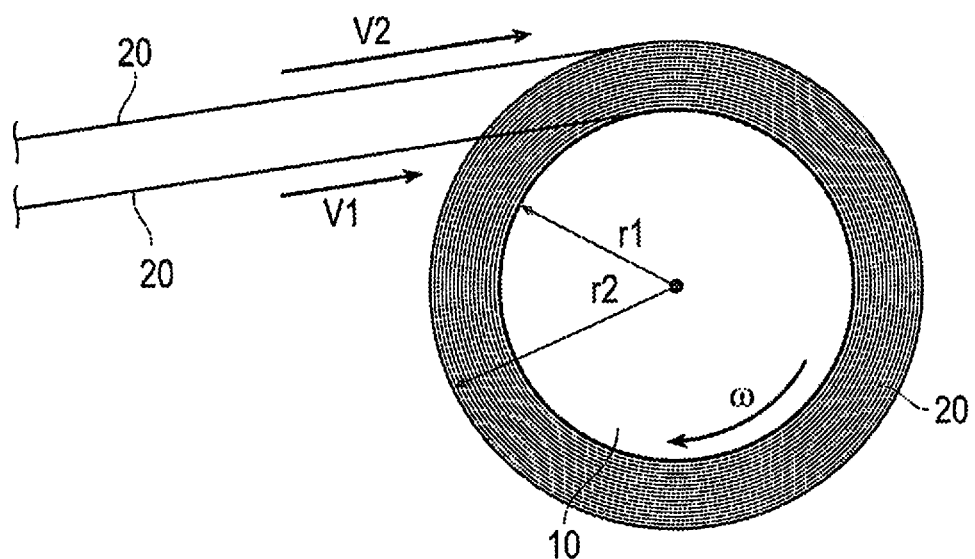
FIG. 9 is a view illustrating a state in which a reinforcing member is wound around a liner.

In addition, if the liner 10 is rotated at a constant angular velocity co to wind the reinforcing member 20 around the outer perimeter surface 10A of the liner 10, the transport speed of the reinforcing fibers 21 changes according to the radius at the time of winding, as is illustrated in FIG. 9. Specifically, when the reinforcing member 20 is wound further on the outer perimeter side, the transport speed of the reinforcing fibers 21 is increased. Therefore, the transport speed of the reinforcing fibers 21 increases from the front end to the rear end in the transport direction. Accordingly, the irradiation amount of the plasma P onto the reinforcing fibers 21 is continuously gradually reduced from the winding start end portion 20a to the winding termination end portion 20b of the reinforcing member 20. In the present embodiment, in addition to the foregoing, it is preferable to continuously gradually reduce the irradiation amount of the plasma P onto the reinforcing fibers 21 that constitute the reinforcing member 20, from the winding start end portion 20a to the winding termination end portion 20b, by increasing the angular velocity co, decreasing the irradiation intensity of the irradiation unit 120, and the like.

Next, the effects of the high-pressure gas storage container 1 according to the present embodiment will be described with reference to FIGS. 10A-12.

Figure 10A:
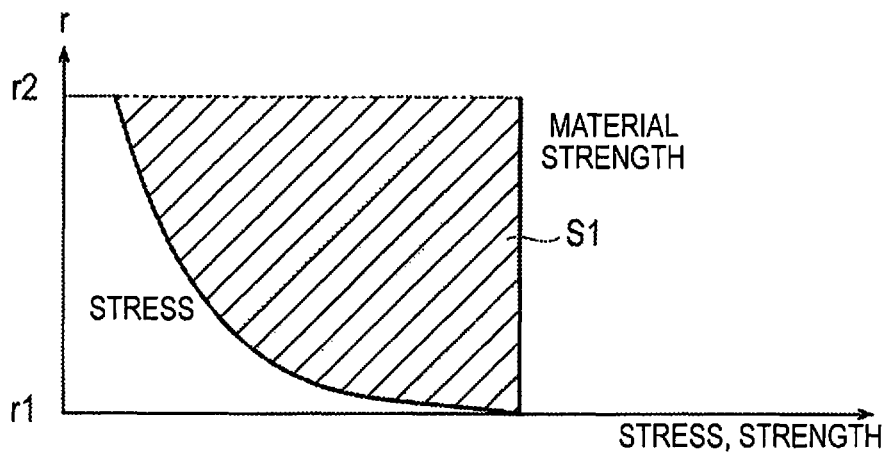
FIG. 10A is a view for explaining the effect on a high-pressure gas storage container.

FIG. 10A is a graph illustrating the relationship between the stress that is generated in a reinforcing layer and the material strength of the reinforcing layer when plasma P is not irradiated.

Here, a strength design is implemented at the inner perimeter side of the reinforcing layer, where the greatest stress is generated. Therefore, an excessive strength design, corresponding to the area indicated by reference symbol S1 in FIG. 10A, is implemented, thereby increasing the weight of the high-pressure gas storage container.

Figure 10B:
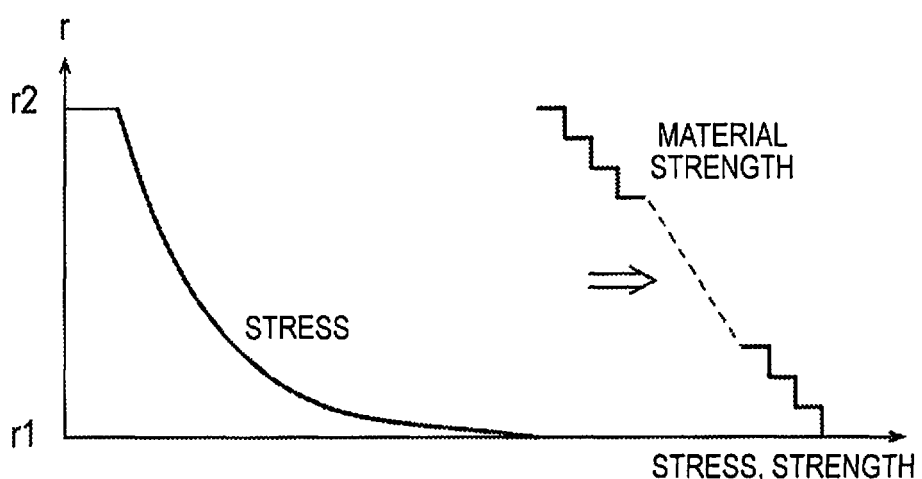
FIG. 10B is a view for explaining the effect on the high-pressure gas storage container.

In contrast, in the case of a reinforcing layer 30 formed by winding the reinforcing member 20 described above around the outer perimeter surface 10A of the liner 10, the strength of the reinforcing layer 30 is enhanced so as to increase from the outer perimeter side toward the inner perimeter side, as is illustrated in FIG. 10B (refer to the arrow in FIG. 10B). Then, as the strength of the reinforcing layer 30 is enhanced, a margin of strength is accordingly generated on the inner perimeter side in addition to the outer perimeter side.

Figure 10C:
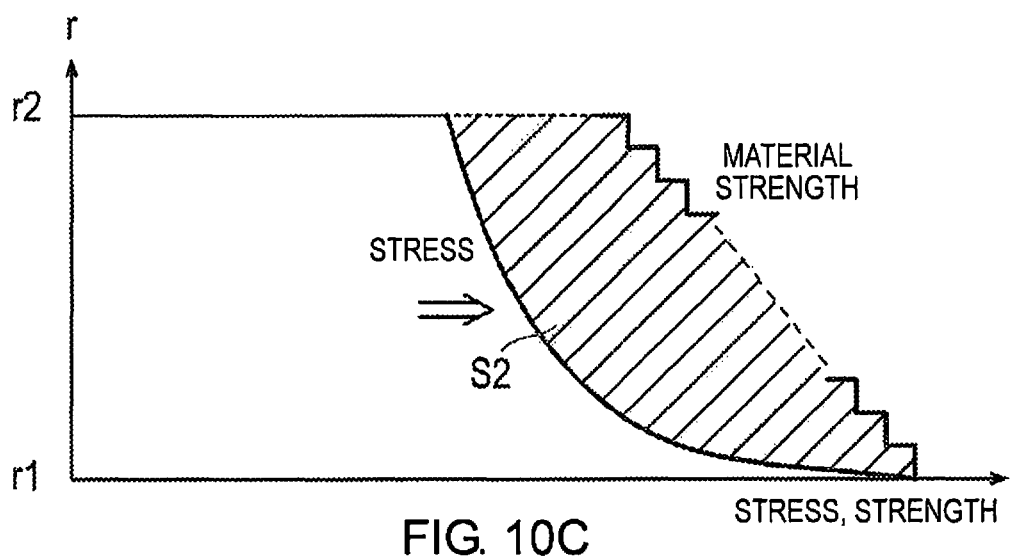
FIG. 10C is a view for explaining an effect on the high-pressure gas storage container.

It is then possible to reduce the amount of the reinforcing member 20 that is wound around the outer perimeter surface 10A of the liner 10 to an extent that does not exceed the strength distribution of the reinforcing layer 30. As a result, although the stress that is generated in the reinforcing layer 30 increases, as is illustrated in FIG. 10C, the area indicated by reference symbol S2 in FIG. 10C becomes smaller than the area indicated by the reference symbol S1 in FIG. 10A. Thus, the design of excess strength will be relaxed. Therefore, it is possible to reduce the weight of the high-pressure gas storage container 1 by reducing the amount of the reinforcing member 20 that is wound around the liner 10 to reduce the wall thickness of the reinforcing layer 30 while maintaining suitable strength.

Figure 11:
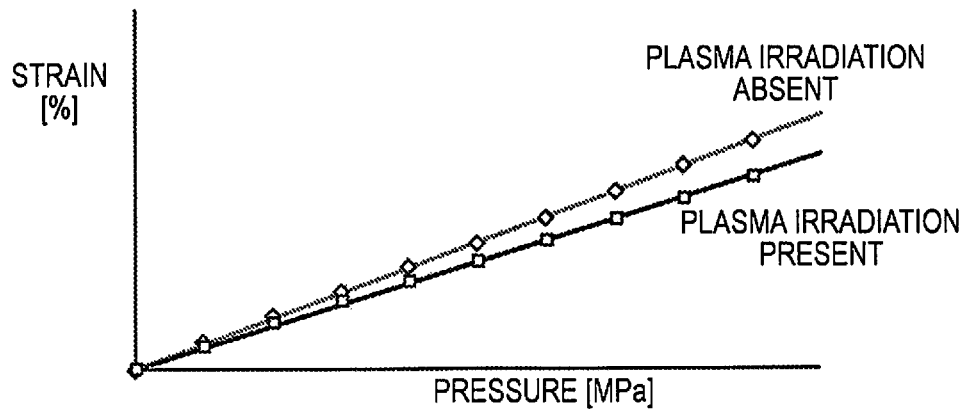
FIG. 11 is a graph illustrating the relationship between the applied pressure on the high-pressure gas storage container and strain.

In addition, FIG. 11 is a graph illustrating the relationship between pressure that acts on the high-pressure gas storage container and strain. In FIG. 11, the horizontal axis represents pressure and the vertical axis represents strain. Additionally, the straight line that includes the rhomboidal plot points in FIG. 11 illustrates the relationship between the pressure of the high-pressure gas storage container containing reinforcing fibers onto which plasma has not been irradiated and strain. In addition, the straight line that includes the rectangular plot points illustrates the relationship between the pressure of the high-pressure gas storage container 1 according to the present embodiment and strain. FIG. 11 also shows empirical values for the strain, which were measured with a strain gauge affixed to the outer perimeter side of the reinforcing layer.

As is illustrated in FIG. 11, it can be seen that the numerical value of the strain is reduced by irradiating plasma P onto the reinforcing fibers 21. That is, it can be seen that the strength of the reinforcing members 20 is improved by irradiation of the plasma P.

Figure 12:
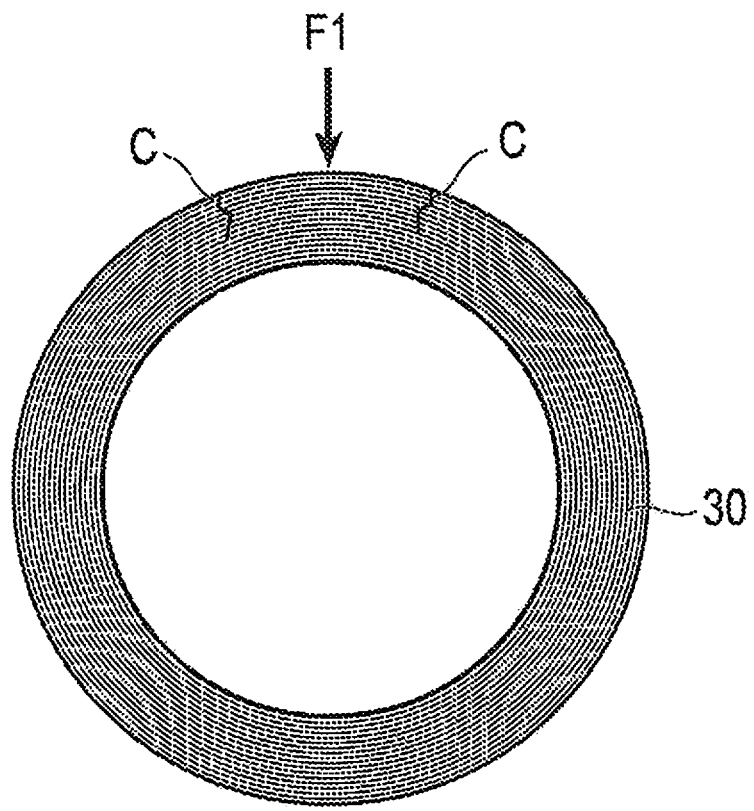
FIG. 12 is a view illustrating a state in which cracks are generated on the outer perimeter side of a high-pressure gas storage container.

In addition, according to the high-pressure gas storage container 1 of the present embodiment, the reinforcing fibers 21 that constitute the reinforcing member 20 are formed such that the irradiation amount of the plasma P is continuously gradually reduced from the winding start end portion 20a to the winding termination end portion 20b of the reinforcing member 20 with respect to the liner 10. Thus, it is possible to increase the strength of the inner perimeter side more than the outer perimeter side of the reinforcing layer 30. Therefore, when an unexpected external force F1 acts on the high-pressure gas storage container 1 on the outer perimeter side, it is possible to preferentially generate cracks C on the outer perimeter side, as is illustrated in FIG. 12. Therefore, it is possible to detect those portions in which cracks have occurred by visual inspection, and thus to improve detectability.

In addition, according to the high-pressure gas storage container 1 of the present embodiment, the reinforcing fibers 21 that constitute the reinforcing member 20 are formed such that the irradiation amount of the plasma P is continuously gradually reduced from the winding start end portion 20a to the winding termination end portion 20b of the reinforcing member 20 with respect to the liner 10. Therefore, because the strength distribution of the reinforcing member 20 continuously gradually decreases from the winding start end portion 20a to the winding termination end portion 20b, it is possible to suitably suppress the occurrence of shear fractures between the layers 31, 32.

As described above, the high-pressure gas storage container 1 according to the present embodiment is a structure comprising a reinforcing member 20 made of reinforcing fibers 21 impregnated with a resin 22. The reinforcing member 20 includes a first region A1 formed by irradiating the reinforcing fibers 21 with plasma P, and a second region A2 formed by irradiating the reinforcing fibers 21 with a smaller amount of the plasma P than the first region A1. In addition, the high-pressure gas storage container 1 is formed by providing the container with the reinforcing member 20 such that the first region A1 is positioned in a location that requires greater strength than the second region A2. According to a high-pressure gas storage container 1 configured in this manner, it is possible to add an acidic functional group to the reinforcing fibers 21 by irradiating plasma P on the reinforcing fibers 21. As a result, the adhesiveness of the resin 22 to the reinforcing fibers 21 is improved, as is the strength of the reinforcing member 20. Then, the first region A1 where the strength has been relatively enhanced by irradiating relatively more plasma P is positioned on the inner perimeter side of the reinforcing layer 30, where strength is required. Therefore, even if the wall thickness is reduced, because the strength has been enhanced by irradiating the plasma P, it is possible to maintain suitable strength. Thus, it is possible achieve a reduction in overall weight by reducing the wall thickness while maintaining suitable strength.

In addition, the high-pressure gas storage container 1 further comprises a core member, which is the liner 10, and the reinforcing member 20 has a strip shape. The strip-shaped reinforcing member 20 is wound around the outer perimeter surface 10A of the liner 10 to constitute a reinforcing layer 30 made up of a plurality of layers. In the reinforcing layer 30, the inner perimeter side of the reinforcing layer 30 is constituted by the first region A1 and the outer perimeter side of the reinforcing layer 30 is constituted from the second region A2. According to a structure configured in this manner, it is possible to increase the strength of the inner perimeter side of the reinforcing layer 30. Therefore, it is possible to reduce the amount of the reinforcing member 20 that is wound, even around a structure onto which high pressure acts on the inner perimeter side of the reinforcing layer 30, while maintaining suitable strength. Therefore, it is possible achieve a reduction in the overall weight of the product by reducing the wall thickness of the reinforcing layer 30.

Additionally, the core member is a liner 10 that houses high-pressure gas. It is thus possible to reduce the amount of the reinforcing member 20 that is wound around the high-pressure gas storage container 1, while maintaining suitable strength. Therefore, it is possible achieve a reduction in the overall weight of the product by reducing the wall thickness of the reinforcing layer 30.

In addition, the reinforcing member 20 is formed such that the irradiation amount of the plasma P onto the reinforcing fibers 21 is continuously gradually reduced from the winding start end portion 20a to the winding termination end portion 20b with respect to the liner 10. According to this configuration, because the strength of the reinforcing member 20 continuously gradually decreases from the winding start end portion 20a to the winding termination end portion 20b, it is possible to suitably suppress the occurrence of shear fractures between the layers 31, 32.

Additionally, as described above, the method for producing a high-pressure gas storage container 1 according to the present embodiment is a method for producing a high-pressure gas storage container 1 comprising a reinforcing member 20 made of reinforcing fibers 21 impregnated with a resin 22. In the method for producing the high-pressure gas storage container 1, reinforcing fibers 21 are irradiated with a plasma P and impregnated with a resin 22 to form a first region A1 in the reinforcing member 20. The reinforcing fibers 21 are then irradiated with a smaller amount of the plasma P than the first region A1 and impregnated with a resin 22 to form a second region A2 of the reinforcing member 20. The first region A1 is then positioned in a location that requires greater strength than the second region A2. According to this production method, it is possible to add an acidic functional group to the reinforcing fibers 21 by irradiating plasma P onto the reinforcing fibers 21. As a result, the adhesiveness of the resin 22 to the reinforcing fibers 21 is improved, as is the strength of the reinforcing member 20. Then, the first region A1 where the strength has been relatively enhanced by irradiating relatively more plasma P is positioned on the inner perimeter side of the reinforcing layer 30, where strength is required. Therefore, even if the wall thickness is reduced, because the strength has been enhanced by irradiation of the plasma P, it is possible to maintain suitable strength. Thus, it is possible to provide a high-pressure gas storage container 1 that can realize a reduction in overall weight by reducing the wall thickness while maintaining a suitable strength.

Additionally, that reinforcing fibers 21 that are formed in a strip shape are transported and the reinforcing fibers 21 are irradiated with plasma P on the front end in the transport direction and impregnated with a resin 22 to form a first region A1 in the reinforcing member 20. In addition, the reinforcing fibers 21 are irradiated with a smaller amount of the plasma P than the first region A1 on the rear end in the transport direction and impregnated with a resin 22 to form a second region A2 in the reinforcing member 20. The reinforcing member 20 in which the first region A1 and the second region A2 have been formed is then wound around the core member, which is the liner 10. According to this production method, it is possible to increase the strength of the inner perimeter side of the reinforcing layer 30. Therefore, it is possible to reduce the amount of the reinforcing member 20 that is wound, even around a structure onto which high pressure acts on the inner perimeter side of the reinforcing layer 30, while maintaining a suitable strength. Therefore, it is possible achieve a reduction in the overall weight of the product by reducing the wall thickness of the reinforcing layer 30.

In addition, the core member is a liner 10 that houses high-pressure gas. Accordingly, it is possible to reduce the amount of the reinforcing member 20 that is wound around the high-pressure gas storage container 1 while maintaining a suitable strength. Therefore, it is possible achieve an overall reduction in weight of the product by reducing the wall thickness of the reinforcing layer 30.

In addition, the plasma P is irradiated, as the irradiated amount is continuously gradually reduced, onto the reinforcing fibers 21, from the winding start end portion 20a to the winding termination end portion 20b of the reinforcing member 20 with respect to the liner 10. According to this production method, it is possible to produce a high-pressure gas storage container in which the strength of the reinforcing member 20 continuously gradually decreases from the winding start end portion 20a to the winding termination end portion 20b. Accordingly, it is possible to suitably suppress the occurrence of shear fractures between the layers 31 and 32.

In addition, the irradiation amount of the plasma P is adjusted by adjusting at least one of the plasma voltage, current, frequency, electrodes, and gas conditions to adjust the irradiation intensity of the plasma P. According to this production method, it is possible to easily adjust the irradiation amount of the plasma P with respect to the reinforcing fibers 21. Therefore, it is possible to adjust the strength of the reinforcing member 20 such that the area indicated by the reference symbol S2 in FIG. 10C is reduced. In this manner, the design of excess strength can be further relaxed by reduction of the area indicated by the reference symbol S2.

Additionally, the irradiation amount of the plasma P can be adjusted by changing the transport speed of the reinforcing fibers 21 during irradiation of plasma P onto the reinforcing fibers 21. According to this production method, it is possible to increase the transport speed of the reinforcing fibers 21 during irradiation of plasma P onto the reinforcing fibers 21 on the outer perimeter side of the reinforcing layer 30, where the irradiation amount of the plasma P onto the reinforcing fibers 21 is low. Therefore, it is possible to reduce the manufacturing time and to enhance productivity.

Additionally, the plasma P is irradiated onto the surface 21A of the reinforcing fibers 21 from a direction that is tilted from the Y axis direction that is orthogonal to the surface 21A. According to this production method, because the plasma gas is irradiated from a direction that is tilted from the surface 21A of the reinforcing fibers 21, compression of the plasma gas is suppressed, and it is possible to carry out irradiation while allowing the high-temperature portion at the center to be released. Therefore, it is possible to efficiently irradiate plasma P onto the reinforcing fibers 21 and to add an acidic functional group to the reinforcing fibers 21 while reducing damage to the reinforcing fibers 21.

First Modified Example

A first modified example of the above-described embodiment will be described below.

A high-pressure gas storage container according to the first modified example is different from the high-pressure gas storage container 1 according to the embodiment described above in the distribution of the irradiation amount of the plasma P onto the reinforcing fibers 21.

Figure 13:
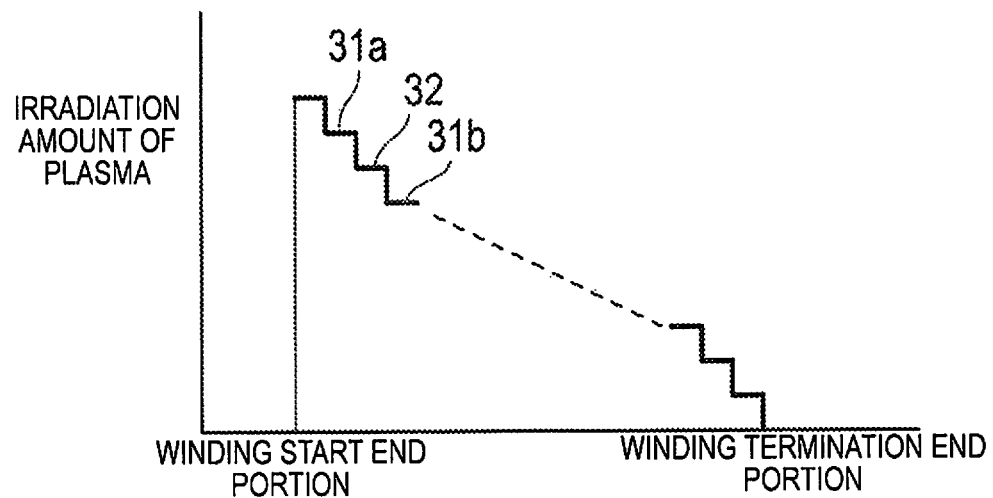
FIG. 13 is a graph illustrating the distribution of the plasma irradiation amount according to a first modified example.

FIG. 13 is a graph illustrating a distribution of the irradiation amount of the plasma P according to the first modified example.

The reinforcing fibers 21 of the high-pressure gas storage container according to the first modified example are formed such that the irradiation amount of the plasma P is gradually reduced in stepwise fashion from the winding start end portion 20a to the winding termination end portion 20b of the reinforcing member 20 with respect to the liner 10, as is illustrated in FIG. 13.

More specifically, a set amount of plasma P is irradiated onto a hoop layer 31a, as is illustrated in FIG. 13. Additionally, plasma P in a smaller amount than in the hoop layer 31a is irradiated onto an adjacent helical layer 32 on the outer perimeter side of the hoop layer 31a. Furthermore, plasma P in a smaller amount than in the helical layer 32 is irradiated onto an adjacent hoop layer 31b on the outer perimeter side of the helical layer 32. Thereafter, the irradiation amount of the plasma P is gradually reduced in stepwise fashion toward the outer perimeter side, in the order of helical layer 32 and hoop layer 31.

In a reinforcing member 20 made up of reinforcing fibers 21 onto which plasma P has been irradiated in this manner, the strength continuously gradually decreases from the winding start end portion 20a to the winding termination end portion 20b, in the same manner as the distribution of the irradiation amount of the plasma P.

Then, if such a reinforcing member 20 is wound around the outer perimeter surface 10A of the liner 10 to form a reinforcing layer 30, the strength distribution along the radial direction r of the reinforcing layer 30 decreases from the inner perimeter side to the outer perimeter side in the radial direction r, in the same manner as the strength distribution of the reinforcing layer 30 according to the embodiment described above.

Next, a method for producing the high-pressure gas storage container according to the first modified example will be described.

Here, only the step for irradiating plasma P will be described.

In the step for irradiating the plasma P, the plasma P is irradiated, while the irradiated amount is gradually reduced in stepwise fashion, onto the reinforcing fibers 21 that constitute the reinforcing member 20, from the winding start end portion 20a to the winding termination end portion 20b of the reinforcing member 20 with respect to the liner 10. The step for irradiating the plasma P will be described in detail below.

The step for irradiating plasma P includes a first irradiation step for irradiating a set amount of the plasma P onto the reinforcing fibers 21 that constitute the reinforcing member 20 that is wound in/the hoop layer 31, Additionally, the step for irradiating plasma P includes a second irradiation step for irradiating a set amount of the plasma P onto the reinforcing fibers 21 that constitute the reinforcing member 20 that is wound in the helical layer 32.

The first irradiation step and the second irradiation step are carried out in alternating fashion, and the irradiation amount of the plasma P is reduced when switching from the first irradiation step to the second irradiation step, and when switching from the second irradiation step to the first irradiation step.

As described above, in the high-pressure gas storage container according to the first modified example, the reinforcing member 20 is formed such that the irradiation amount of the plasma P onto the reinforcing fibers 21 is gradually reduced in stepwise fashion from the winding start end portion 20a to the winding termination end portion 20b with respect to the liner 10. According to a high-pressure gas storage container configured in this manner, it is possible to increase the strength of the inner perimeter side of the reinforcing layer 30. Therefore, it is possible to reduce the amount of the reinforcing member 20 that is wound, even around a high-pressure gas storage container on which high pressure acts on the inner perimeter side of the reinforcing layer 30, while maintaining a suitable strength. Therefore, it is possible achieve an overall reduction in weight of the product by reducing the wall thickness of the reinforcing layer 30.

Additionally, the reinforcing layer 30 is formed such that the irradiation amount of the plasma P onto the reinforcing fibers 21 is gradually reduced in stepwise fashion for each layer 31, 32. Accordingly, the irradiation amount of the plasma P in one layer 31, 32 becomes constant. Therefore, because the strength of the reinforcing layer 30 in one layer 31, 32 can be made constant, it is possible to provide a high-pressure gas storage container having a favorable strength distribution.

Additionally, in the method for producing a high-pressure gas storage container according to the first modified example, the plasma P is irradiated, while the irradiated amount is gradually reduced in stepwise fashion, onto the reinforcing fibers 21 from the winding start end portion 20a to the winding termination end portion 20b of the reinforcing member 20 with respect to the liner 10. According to this production method, it is possible to produce a high-pressure gas storage container in which the strength of the inner perimeter side of the reinforcing layer 30 is high. Therefore, it is possible to reduce the amount of the reinforcing member 20 that is wound, even around a high-pressure gas storage container on which high pressure acts at the inner perimeter side, while maintaining a suitable strength. Therefore, it is possible achieve an overall reduction in weight of the product by reducing the wall thickness of the reinforcing layer 30.

In addition, when plasma P is irradiated onto the reinforcing fibers 21, the irradiation amount of the plasma P is reduced when the irradiation target of the plasma P switches from the reinforcing fibers 21 in one layer to the reinforcing fibers 21 in another adjacent layer on the outer perimeter side. According to this production method, the irradiation amount of the plasma P in one layer 31, 32 becomes constant. Therefore, because the strength of the reinforcing layer 30 in one layer 31, 32 can be made constant, it is possible to provide a high-pressure gas storage container having a favorable strength distribution.

Second Modified Example

A second modified example of the above-described embodiment will be described below.

A high-pressure gas storage container according to the second modified example is different from the high-pressure gas storage container 1 according to the embodiment described above in the distribution of the irradiation amount of the plasma P onto the reinforcing fibers 21.

Figure 14:
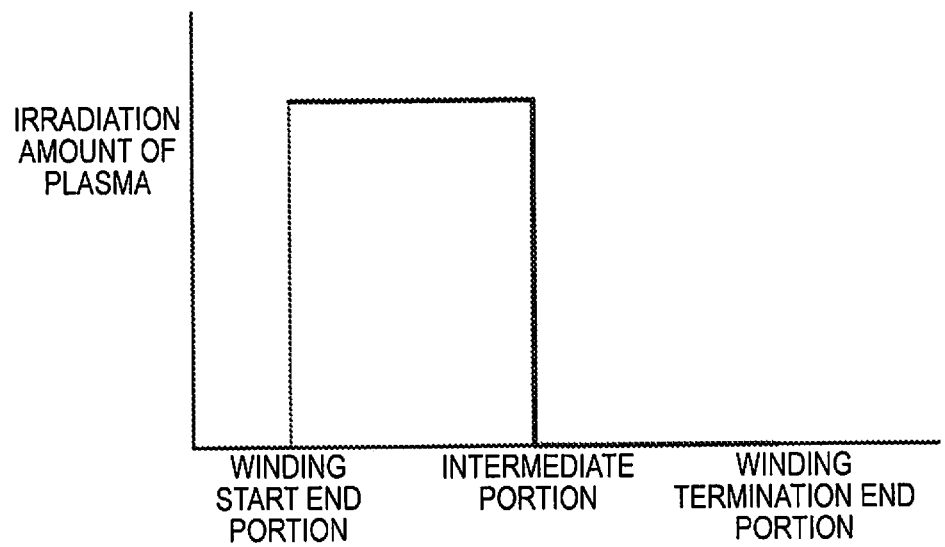
FIG. 14 is a graph illustrating the distribution of the plasma irradiation amount according to a second modified example.

FIG. 14 is a graph illustrating the distribution of the irradiation amount of the plasma P according to a second modified example.

In the second modified example, a set amount of the plasma P is irradiated onto the reinforcing fibers 21 that constitute the reinforcing member 20 from the winding start end portion 20a to an intermediate portion 20c (refer to FIG. 2) positioned between the winding start end portion 20a and the winding termination end portion 20b, as is illustrated in FIG. 14. In addition, plasma P is not irradiated onto the reinforcing fibers 21 that constitute the reinforcing member 20 from the intermediate portion 20c to the winding termination end portion 20b.

A reinforcing member made up of reinforcing fibers 21 onto which plasma P has been irradiated in this manner has a strength distribution in which the strength increases only from the winding start end portion 20a to the intermediate portion 20c, in the same manner as the distribution of the irradiation amount of the plasma P.

Next, a method for producing the high-pressure gas storage container according to the second modified example will be described.

Here, only the step for irradiating the plasma P will be described.

In the step for irradiating the plasma P, a set amount of the plasma P is irradiated onto the reinforcing fibers 21 that constitute the reinforcing member 20 from the winding start end portion 20a to the intermediate portion 20c. Thereafter, irradiation of the plasma P is stopped. That is, plasma P is not irradiated onto the reinforcing fibers 21 that constitute the reinforcing member 20 from the intermediate portion 20c to the winding termination end portion 20b.

Next, the effects of the high-pressure gas storage container according to the second modified example will be described with reference to FIGS. 15A-15C.

Figure 15A:
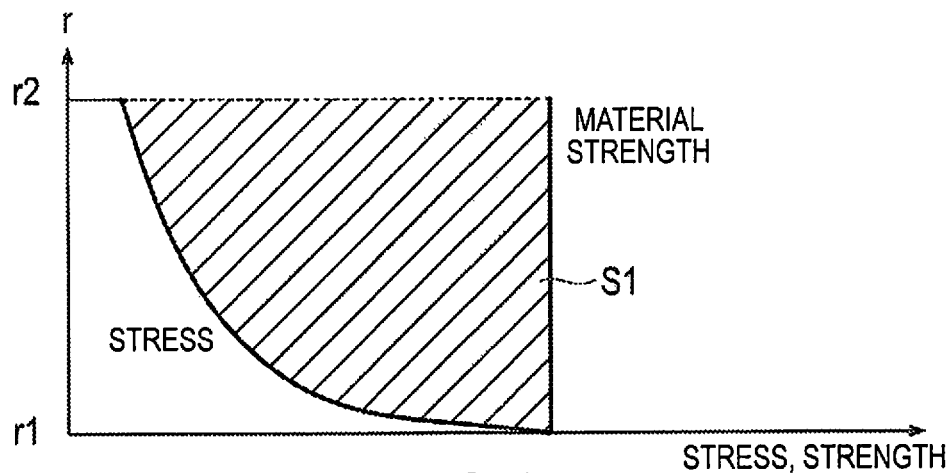
FIG. 15A is a view for explaining the effect on a high-pressure gas storage container according to a second modified example.

FIG. 15A is a graph illustrating the relationship between the stress that is generated in a reinforcing layer and the material strength of the reinforcing layer when plasma P is not irradiated.

Here, as was described above, strength design is implemented at the inner perimeter side of the reinforcing layer, where the greatest stress is generated. Therefore, an excessive strength design, corresponding to the area indicated by reference symbol S1 in FIG. 15A, is implemented, thereby increasing the weight of the high-pressure gas storage container.

Figure 15B:
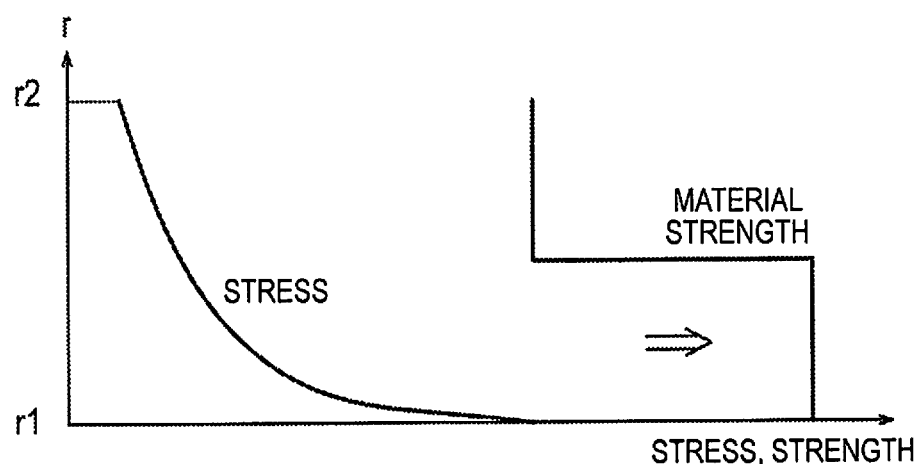
FIG. 15B is a view for explaining an effect on the high-pressure gas storage container according to the second modified example.
Figure 15C:
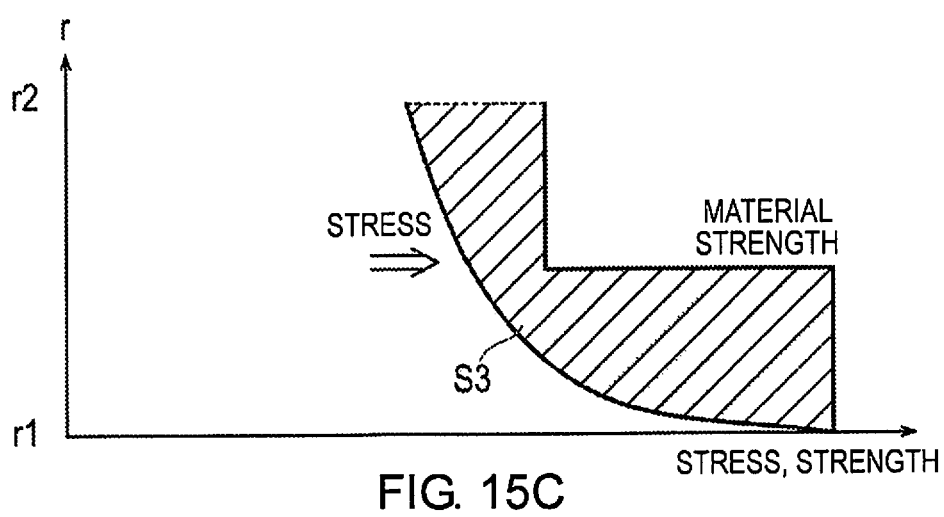
FIG. 15C is a view for explaining an effect on the high-pressure gas storage container according to the second modified example.

In contrast, in the case of a reinforcing layer 30 formed by winding the reinforcing member 20 according to the second modified example around the outer perimeter surface 10A of the liner 10, the strength of the inner perimeter side of the reinforcing layer 30 is enhanced, as is illustrated in FIG. 15B (refer to the arrow in FIG. 15B). Then, as the strength of the inner perimeter side of the reinforcing layer 30 is enhanced, a margin of strength is accordingly generated on the inner perimeter side in addition to the outer perimeter side.

It is then possible to reduce the amount of the reinforcing member 20 that is wound around the outer perimeter surface 10A of the liner 10 to an extent that does not exceed the strength distribution of the reinforcing layer 30. As a result, although the stress that is generated in the reinforcing layer 30 increases, as is illustrated in FIG. 15C, the area indicated by reference symbol S3 in FIG. 15C becomes smaller than the area indicated by the reference symbol S1 in FIG. 15A. Accordingly, the design of excess strength can be relaxed. Therefore, it is possible to reduce the weight of the high-pressure gas storage container by reducing the amount of the reinforcing member 20 that is wound around the liner 10 to reduce the wall thickness of the reinforcing layer 30 while maintaining a suitable strength.

As described above, in the high-pressure gas storage container according to the second modified example, the reinforcing member 20 from the winding start end portion 20a to the intermediate portion 20c is formed such that a set amount of the plasma P is irradiated onto the reinforcing fibers 21. Also, in the reinforcing member 20 from the intermediate portion 20c to the winding termination end portion 20b, plasma P is not irradiated onto the reinforcing fibers 21. When such a reinforcing member 20 is produced, the irradiation of the plasma P may be stopped at the intermediate portion 20c. Therefore, it is possible to easily produce the high-pressure gas storage container.

In addition, as described above, in the method for producing a high-pressure gas storage container according to the second modified example, a set amount of plasma P is irradiated onto the reinforcing fibers 21 that constitute the reinforcing member 20 from the winding start end portion 20a to the intermediate portion 20c. Also, plasma P is not irradiated onto the reinforcing fibers 21 that constitute the reinforcing member 20 from the intermediate portion 20c to the winding termination end portion 20b. According to this production method, because it suffices to stop the irradiation of the plasma P at the intermediate portion 20c, it is possible to easily produce a high-pressure gas storage container.

The present invention is not limited to the embodiment and modified example described above, and various modifications are possible within the scope of the claims.

Figure 16:
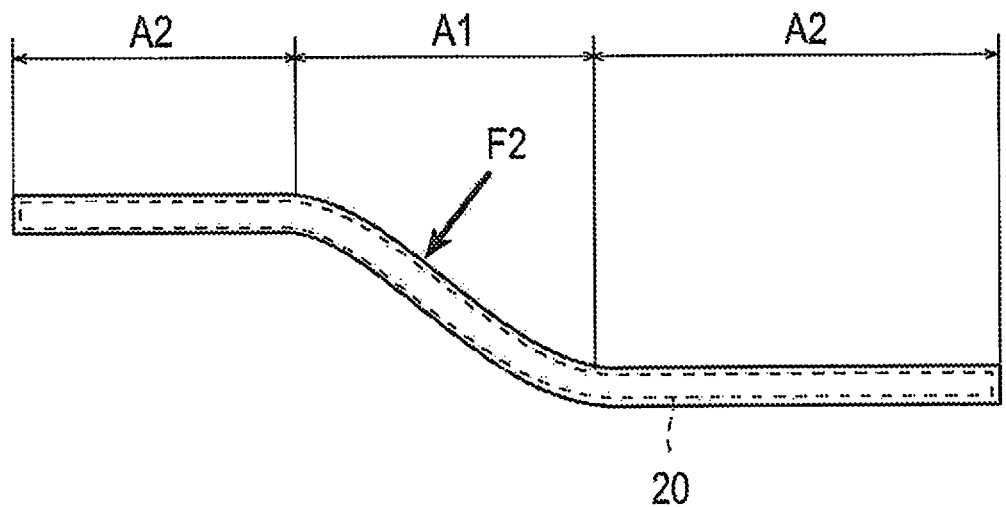
FIG. 16 is a schematic view of an automobile panel.

In the above-described embodiment, the first modified example, and the second modified example, a high-pressure gas storage container formed by winding a reinforcing member 20 around the outer perimeter surface 10A of a liner 10 was described as an example of a structure. However, the invention may be applied to an automobile panel 5 as a structure, such as that shown in FIG. 16. An automobile panel 5 is formed in the form of a panel with a reinforcing member 20 as the core member. The panel 5 is formed according to the RTM (Resin Transfer Molding) method. For example, in the case that an external force F2 shown in FIG. 16 acts on the panel 5, a first region A1 where the strength has been relatively enhanced by irradiating relatively more plasma P is positioned at the periphery of the portion on which the external force F2 acts. As a result, even if the wall thickness is reduced, because the strength has been enhanced by irradiating the plasma P, it is possible to maintain a suitable strength. Accordingly, it is possible to provide a panel 5 for which an overall reduction in weight can be achieved by reducing the wall thickness while maintaining suitable strength.

Additionally, in the embodiment described above, the irradiation intensity of the plasma P is adjusted by adjusting the plasma voltage, current, frequency, electrodes, and gas conditions. However, the irradiation intensity of the plasma P may be adjusted by providing a filter between the irradiation unit 120 and the reinforcing fibers 21. With this configuration, it is possible easily to adjust amount of the plasma P irradiated onto the reinforcing fibers 21 without manipulating the plasma voltage, current, frequency, electrode, and gas conditions.

In addition, in the above-described embodiment, the liner 10 is cylindrical in shape, but it may have the form of a rectangular parallelepiped or the like.

The invention claimed is:

1. A structure comprising:
   a reinforcing member made up of a plurality of reinforcing fibers impregnated with a resin,
   the reinforcing member includes a first region having the reinforcing fibers irradiated with a plasma, and a second region having the reinforcing fibers irradiated with a smaller amount of the plasma than the first region or without plasma irradiation, and the reinforcing member being provided such that the first region is positioned in a location that requires greater strength than the second region.

2. The structure according to claim 1, further comprising a core member, the reinforcing member is strip-shaped, the reinforcing member is wound around an outer perimeter surface of the core member to constitute a reinforcing layer made up of a plurality of layers, and in the reinforcing layer, an inner perimeter side of the reinforcing layer is constituted by the first region and an outer perimeter side of the reinforcing layer is constituted from the second region.

3. The structure according to claim 2, wherein the core member is a liner that houses high-pressure gas.

4. The structure according to claim 2, wherein the amount of the plasma irradiated onto the reinforcing fibers is continuously gradually reduced from a winding start end portion to a winding termination end portion with respect to the core member.

5. The structure according to claim 2, wherein the amount of the plasma irradiated onto the reinforcing fibers is gradually reduced in stepwise fashion from a winding start end portion to a winding termination end portion with respect to the core member.

6. The structure according to claim 5, wherein the amount of the plasma irradiated onto the reinforcing fibers is gradually reduced in stepwise fashion for each of the layers.

7. The structure according to claim 2, wherein the reinforcing member includes a winding start end portion, an intermediate portion, and a winding termination end portion, the intermediate portion is positioned between the winding start end portion and the winding termination end portion, the winding termination end portion has a set amount of the plasma is irradiated onto the reinforcing fibers, and in the reinforcing member from the intermediate portion to the winding termination end portion, the reinforcing fibers have not been irradiated with the plasma.

8. The structure according to claim 1, wherein the structure is a panel with the reinforcing member as a core member.

9. A method for producing a structure comprising a reinforcing member made up of a plurality of reinforcing fibers impregnated with a resin, the method comprising:

forming a first region in the reinforcing member by irradiating the reinforcing fibers with plasma and impregnating with the resin;

forming a second region in the reinforcing member by irradiating the reinforcing fibers with a smaller amount of plasma than the first region, or without plasma irradiation, and impregnating with the resin; and positioning the first region in a location that requires greater strength than the second region.

10. The method according to claim 9, further comprising transporting the reinforcing fibers in a strip shape form, the irradiating of the reinforcing fibers with the plasma and the impregnating with the resin on a front end in a transport direction to form the first region in the reinforcing member, the irradiating of the reinforcing fibers with the smaller amount of the plasma than the first region and the impregnating with the resin on a rear end in the transport direction to form the second region in the reinforcing member, and winding the first region and the second region of the reinforcing member around a core member.

11. The method according to claim 10, wherein the core member of the structure is a liner in which a high-pressure gas is stored.

12. The method according to claim 10, wherein the reinforcing member is formed such that the plasma is irradiated onto the reinforcing fibers while the irradiated amount is continuously reduced from a winding start end portion to a winding termination end portion with respect to the core member.

13. The method according to claim 10, wherein the reinforcing member is formed such that the plasma is irradiated onto the reinforcing fibers while the irradiated amount is reduced in stepwise fashion from a winding start end portion to a winding termination end portion with respect to the core member.

14. The method according to claim 13, wherein when the reinforcing fibers are irradiated with the plasma, the plasma irradiation amount is reduced when an irradiation target of the plasma switches from the reinforcing fibers that constitute the reinforcing member that is wound in one layer to the reinforcing fibers that constitute the reinforcing member that is wound in another adjacent layer on an outer perimeter side of the one layer.

15. The method according to claim 10, wherein a set amount of plasma is irradiated onto the reinforcing fibers that constitute the reinforcing member from a winding start end portion of the reinforcing member with respect to the core member to an intermediate portion that is positioned between the winding start end portion and a winding termination end portion, and the plasma is not irradiated onto the reinforcing fibers that constitute the reinforcing member from the intermediate portion of the reinforcing member to the winding termination end portion.

16. The method according to claim 9, wherein the structure is a panel with the reinforcing member as a core member.

17. The method according to claim 9, wherein the plasma irradiation amount is adjusted by adjusting at least one of the plasma voltage, current, frequency, electrodes, and gas conditions to adjust an irradiation intensity of the plasma.

18. The method according to claim 9, wherein the plasma irradiation amount is adjusted by providing a filter between an irradiation unit for the plasma and the reinforcing fibers to adjust the irradiation intensity of the plasma.

19. The method according to claim 9, further comprising adjusting a plasma irradiation amount by changing a transport speed of the reinforcing fibers during irradiation of the reinforcing fibers with the plasma.

20. The method according to claim 9, wherein the plasma is irradiated onto a surface of the reinforcing fibers from a direction that is tilted with respect to a direction that is orthogonal to the surface of the reinforcing fibers.

* * * * *